United States Patent [19]

Markunas

[11] Patent Number: 4,751,438
[45] Date of Patent: Jun. 14, 1988

[54] BRUSHLESS DC MOTOR CONTROL

[75] Inventor: Albert L. Markunas, Roscoe, Ill.

[73] Assignee: Sundstrand Corporation, Rockford, Ill.

[21] Appl. No.: 810,854

[22] Filed: Dec. 18, 1985

[51] Int. Cl.$^4$ .............................................. H02P 6/02
[52] U.S. Cl. ..................... 318/254; 318/138; 318/310
[58] Field of Search ............... 318/138, 254, 309, 310, 318/311, 312, 313, 314, 439

[56] References Cited

U.S. PATENT DOCUMENTS

| | | | |
|---|---|---|---|
| 3,908,130 | 9/1975 | Lafuze | 318/254 A X |
| 4,223,261 | 9/1980 | White | 318/314 X |
| 4,249,116 | 2/1981 | Hieda | 318/254 |
| 4,270,074 | 5/1981 | Duckworth et al. | 318/254 |
| 4,353,016 | 10/1982 | Born | 318/254 |
| 4,368,411 | 1/1983 | Kidd | 318/254 |
| 4,446,409 | 5/1984 | Rawicz et al. | 318/632 |
| 4,454,458 | 6/1984 | Holland | 318/138 X |
| 4,479,078 | 10/1984 | Kidd et al. | 318/254 |
| 4,494,051 | 1/1985 | Bailey | 318/254 |
| 4,494,052 | 1/1985 | Kelleher et al. | 318/254 |
| 4,525,657 | 6/1985 | Nakase et al. | 318/254 |
| 4,546,293 | 10/1985 | Peterson et al. | 318/254 |
| 4,608,527 | 8/1986 | Glennon et al. | 318/685 |

FOREIGN PATENT DOCUMENTS 56-74094  6/1981  Japan ................................. 318/254

Primary Examiner—Bentsu Ro
Attorney, Agent, or Firm—Wood, Dalton, Phillips, Mason & Rowe

[57] ABSTRACT

Unlike brush-type DC motors, a brushless permanent magnet DC motor has an impedance which is resistive at low rotational speeds and becomes increasingly inductive at higher speeds. Consequently, a control for a brushless permanent magnet DC motor must control both supply voltage and commutation angle in order to maximize motor performance. The simultaneous control of both supply voltage and commutation angle is difficult to achieve and requires complex circuitry. The present invention overcomes this problem by providing first means for developing a motor performance command signal representing a desired motor operational characteristics, second means for developing a motor feedback signal representing an actual motor operational characteristic, and means coupled to the first and second developing means for deriving the commutation angle command signal and the voltage command signal from the motor performance command signal and the motor feedback signal so that the motor operates with the desired operational characteristic.

11 Claims, 5 Drawing Sheets $f_1(X,N)$

BRUSHLESS DC MOTOR CONTROL

DESCRIPTION

1. Field of the Invention

This invention relates generally to motor controls, and more particularly, to a control for a brushless DC motor.

2. Background of the Invention

Conventional brush-type DC motors have inherent design difficulties which affect the life span and reliability of the motor. Among these difficulties are brush wear, brush arcing, acoustic noise due to brush contact and rotor heat dissipation. Because of these problems with brush-type DC motors, brushless DC motors have been finding wide acceptance in various applications such as tape or disk drives, and aircraft and missile electromechanical actuators.

While eliminating the aforementioned problems relating to brush-type DC motors, the brushless DC motor presents problems of its own. In a conventional brush-type DC motor, the voltage-current operational characteristics are dominated by the resistance of the armature windings and the brushes at all practical rotational speeds. However, the impedance of a permanent magnet brushless DC motor is resistive at low rotational speeds and becomes increasingly inductive at higher speeds. This results in the requirement to control both supply voltage and commutation angle, or phase advance, in order to maximize motor performance.

The simultaneous control of supply voltage and commutation angle is difficult to achieve and requires complex circuitry.

The present invention is intended to overcome these and other problems associated with brushless DC motor controls.

SUMMARY OF THE INVENTION

In accordance with the present invention, a control for a brushless DC motor according to the present invention permits a brushless DC motor to be operated in a simple fashion according to a desired operational characteristic.

Broadly, there is disclosed herein a control for a brushless DC motor that includes a permanent magnet rotor and a stator having stator coils which are energized in accordance with a commutation angle command signal and a voltage command signal for imparting rotation to the rotor. The control comprises first means for developing a motor performance command signal representing a desired operational characteristic of the motor, second means for developing a motor feedback signal representing an actual operational charactericits of the motor and means coupled to the first and second developing means for deriving the commutation angle command signal and the voltage command signal from the motor performance command signal and the motor feedback signal so that the motor exhibits the desired operational characteristic.

Specifically, in the preferred embodiment of the invention, the motor control includes a motor system controller coupled to a motor electronic control circuit. The motor system controller develops a motor performance command signal in response to an input command signal and a feedback signal from the motor. The motor performance command signal may represent, for example, a command for constant torque or a command for torque as a function of motor speed. The function generator is responsive to the motor performance command signal and the motor feedback signal and develops both a commutation angle command signal and a voltage command signal therefrom. The commutation angle command signal and the voltage command signal are utilized by the motor electronic control circuit to drive the motor in the commanded fashion.

The function generator is implemented either by software in a microprocessor or by hardware. In the peferred embodiment, the function generator utilizes mathematical models of the motor operation which correlate voltage and commutation angle commands with torque commands as a function of motor speed.

In an alternative embodiment of the invention, means are included for developing a predicted DC motor current signal which is then compared to an actual DC motor current signal to develop an error signal. The error signal is used to modify the voltage and commutation angle command signals to minimize any such error and further improve motor performance.

Further features and advantages of the invention will readily be apparent from the specification and from the drawings.

BEST MODE FOR CARRYING OUT THE INVENTION

Figure 1:
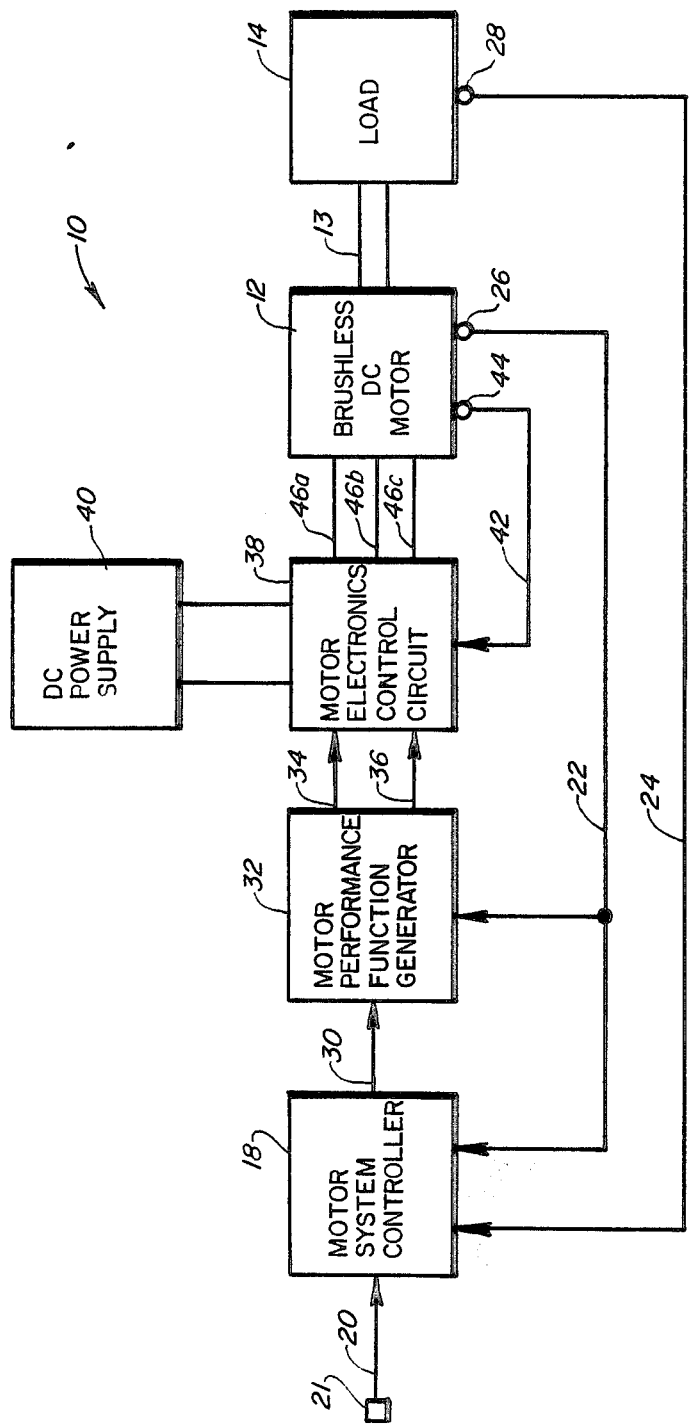
FIG. 1 is a block diagram of the motor control according to the present invention.

Referring first to FIG. 1, there is illustrated a block diagram of a control 10 according to the present invention for controlling a permanent magnet DC motor 12. The motor 12 includes a permanent magnet rotor (not shown) coupled to a shaft 13 for driving a load 14.

In the illustrated embodiment, the motor is operated to supply motive power to a starting and stopping load, such as an actuator. It should be understood, however, that the motor may alternatively drive a continuously rotating load, such as a fan or blower, if desired.

The motor control 10 includes a motor system controller 18 which receives an input command signal on a line 20 from a command signal generator 21. The command signal generator 21 may be any type of device for generating signals in response to operator input, such as a potentiometer. The motor system controller 18 also receives feedback signals from both the motor 12 and the load 14 on lines 22 and 24, respectively. The motor feedback signal on the line 22 is developed by a motor sensor 26 and may represent, for example, motor speed. Similarly, the load feedback signal on the line 24 is developed by a load sensor 28 which may represent load position. In the event the motor is used to drive a continuously rotating load, the feedback signal on the line 24 would be unnecessary.

The motor system controller 18 is responsive to the command signal on the line 20, the motor feedback signal on the line 22 and the load feedback signal on a line 24 and develops a motor performance command signal on a line 30. The motor performance command signal on the line 30 may be, for example, a command for constant torque or a command for torque as a function of motor speed.

The motor performance command signal on the line 30 is coupled to a motor performance function generator 32. Also coupled to the function generator 32 is the motor feedback signal on the line 22. The function generator 32 is responsive to the motor performance command signal on the line 30 and the motor feedback signal on the line 22, and derives both a commutation angle command signal on a line 34 and a voltage command signal on a line 36 therefrom.

The commutation angle command signal on the line 34 and the voltage command signal on the line 36 are coupled to a motor electronics control circuit 38. Also coupled to the motor electronics control circuit 38 is a DC power supply, represented by a block 40 and a second motor feedback signal on a line 42 which is developed by a sensor 44 and which represents rotor position.

The motor electronics control circuit 38 includes a voltage source inverter (not shown) and utilizes the commutation angle command signal on the line 34 and the voltage command signal on the line 36 and develops AC power on lines 46a–46c to energize the stator windings of the motor 12 in appropriate fashion so that the motor 12 exhibits desired operational characteristics.

The motor electronics control circuit 38 may be any known control for operating a brushless DC motor in accordance with commutation angle and voltage commands using a voltage source inverter. For example, the control may be that disclosed in Glennon, U.S. patent application Ser. No. 451,642, filed Dec. 20, 1982 now U.S. Pat. No. 4,608,527, entitled "Phase Advance Waveform Generator for Brushless DC Actuator System Controller", assigned to the assignee of the instant application and the disclosure of which is hereby incorporated by reference.

Figure 2:
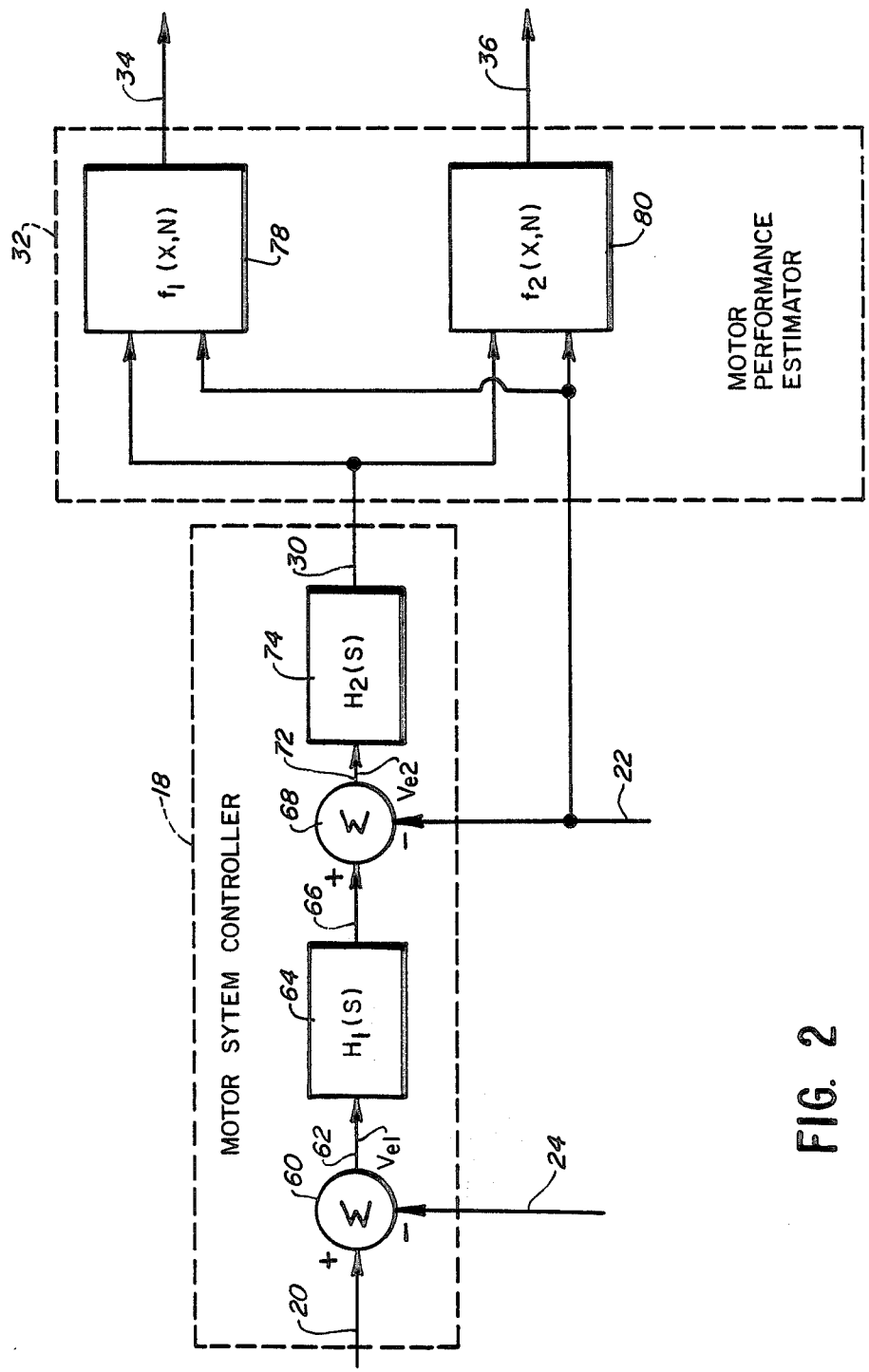
FIG. 2 is a block diagram of the preferred embodiment of the present invention.

Referring now to FIG. 2, there is illustrated in greater detail the motor system controller 18 and the motor operation function generator 32 shown in block diagram form in FIG. 1. In the preferred embodiment, the function generator 32 is implemented by software in a microprocessor, although the function generator 32 could alternatively be implemented by means of analog electronic circuitry, if desired.

In the illustrated embodiment, the motor system controller 18 receives a position command signal on the line 20 and develops the motor performance command signal on the line 30 for operating the motor 12. The motor performance command signal may comprise a torque command signal or another command signal.

The position command signal on the line 20 and the actuator position feedback signal on the line 24 are both coupled to a first summing junction 60 which generates a first error signal $V_{e1}$ on a line 62 representing the difference between the two inputs. The first error signal $V_{e1}$ is coupled to a control block 64 which modifies the error signal using a control algorithm represented by a transfer function $H_1(s)$. The transfer function $H_1(s)$ may be, for example, a gain and lead/lag compensation function. The output of the control block 64 is a speed command signal on a line 66 which is coupled to a second summing junction 68. Also coupled to the summing junction 68 is the motor speed feedback signal on the line 22. The second summing junction 68 generates a second error signal $V_{e2}$ on a line 72 representing the difference between the signals on the lines 66 and 22. The second error signal on the line 72 is coupled to a control block 74 which modifies the second error signal using a control algorithm represented by a transfer function $H_2(s)$ which may be, for example, a further gain and lead/lag compensation function. The output of the control block 74 is the motor performance command signal on the line 30.

The motor performance command signal on the line 30 and the motor speed feedback signal on the line 22 are coupled to the function generator 32 comprising blocks 78 and 80. The function generator 32 implements mathematical models of the operational characteristics of the brushless DC motor. The mathematical models are represented by first and second bivariate functions $f_1(X, N)$ and $f_2(X, N)$, which correlate voltage and commutation angle with torque commands as a function of motor speed.

Figure 3:
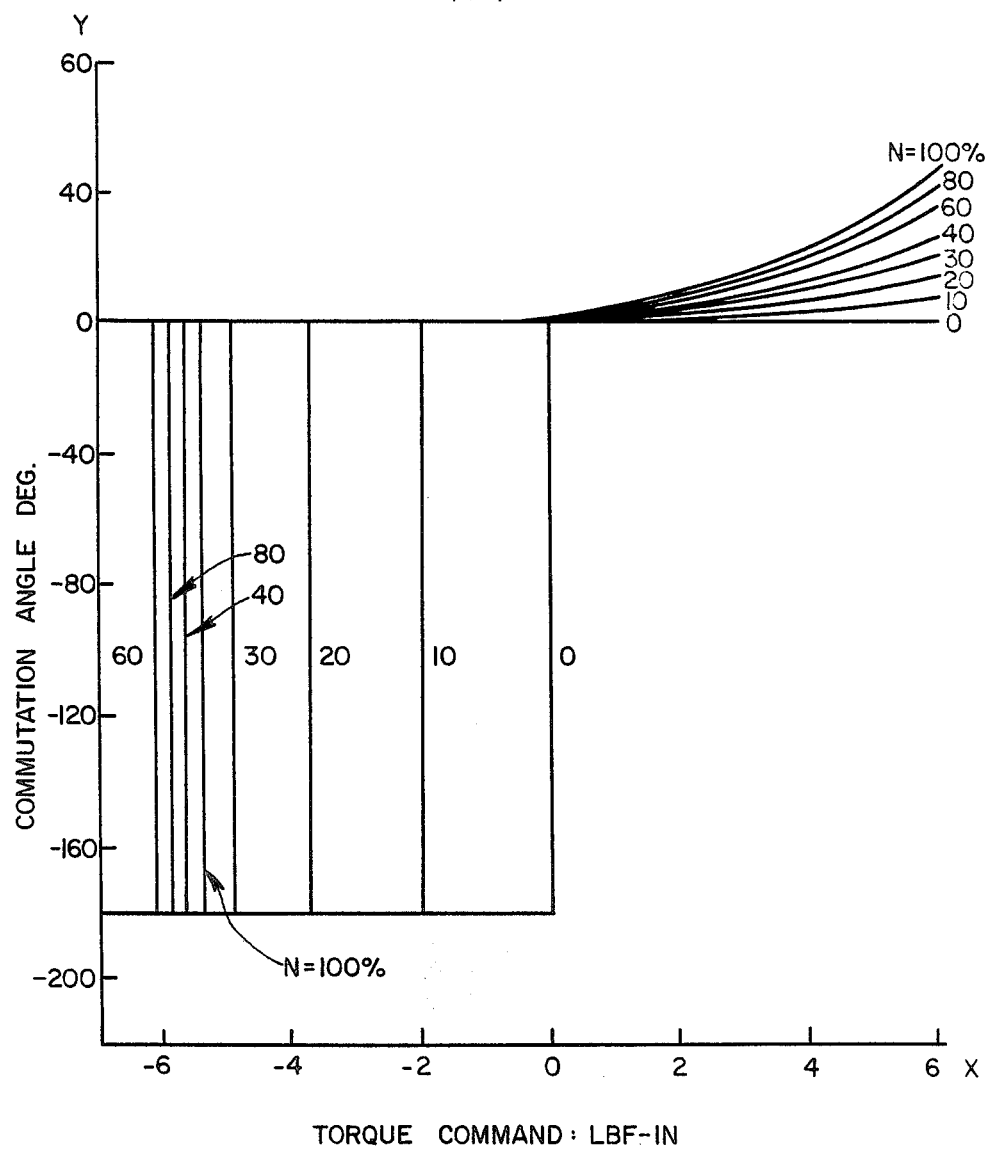
FIG. 3 comprises a first series of curves representing the relationship between motor speed, torque command and a commutation angle for one type of motor.

More specifically, and with reference to FIG. 3, in the preferred embodiment, the first bivariate function $f_1(X, N)$ is represented by a series of mathematical curves representing the relationship between torque command X and the commutation angle required to cause a particular motor to develop the desired torque at different rated speeds N.

Figure 4:
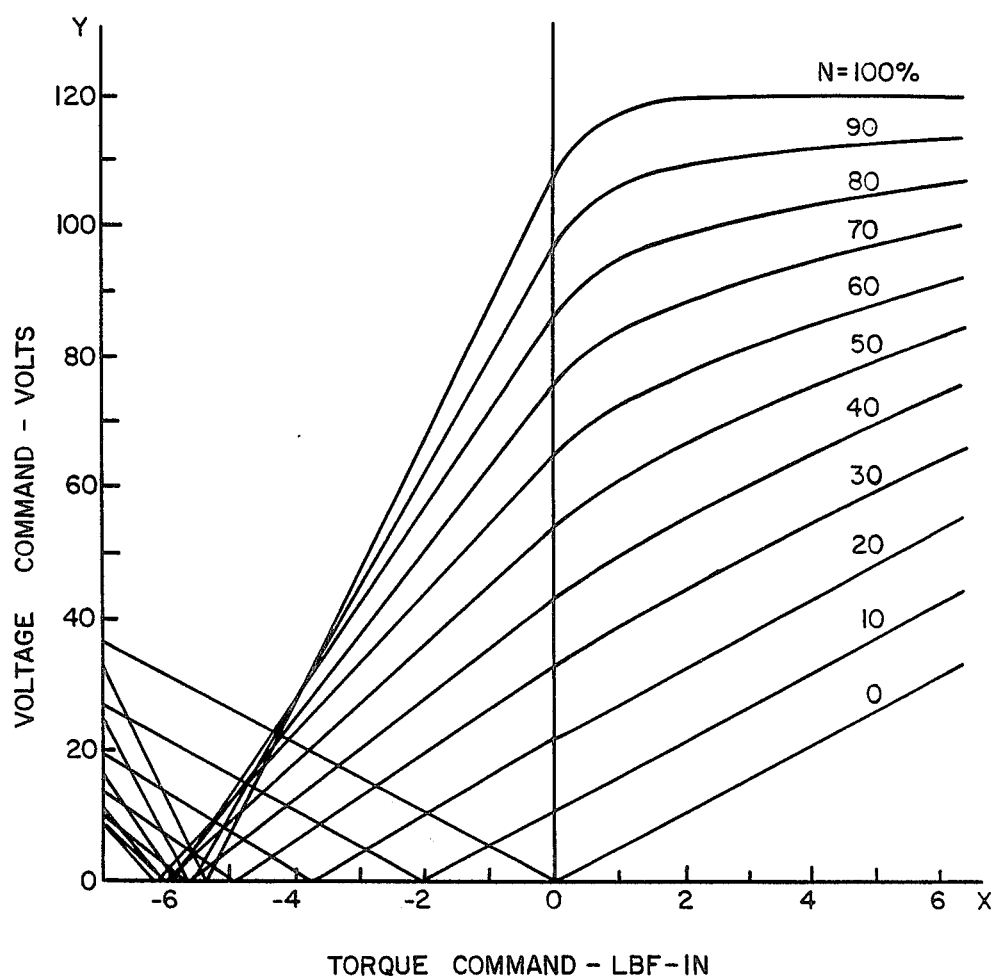
FIG. 4 comprises a second series of curves representing the relationship between motor speed, torque command and voltage command for the same type of motor as represented in the curves of FIG. 3.

Similarly, and with reference to FIG. 4, the second bivariate function $f_2(X, N)$ is represented by a series of mathematical curves representing the relationship between troque command X and the voltage command required to cause the motor to develop the desired torque at different rated speeds N.

Data representing the curves shown in FIGS. 3 and 4 are stored in a memory and accessed by a microprocessor or the blocks 78 and 80 are implemented by analog circuits which provide the illustrated relationships, as noted previously.

It should be noted that the series of curves shown in FIGS. 3 and 4 are exemplary only since they depend upon the particular brushless motor operated by the control 10 and the particular load application for the brushless DC motor.

In the preferred embodiment, the function generator of the present invention can be utilized to operate a motor to develop torque as a function of motor speed, as shown, or alternately constant torque if so required. This results in an ability to emulate the operation of a brush-type DC motor, or to customize the operation of the brushless DC motor, as desired.

Figure 5:
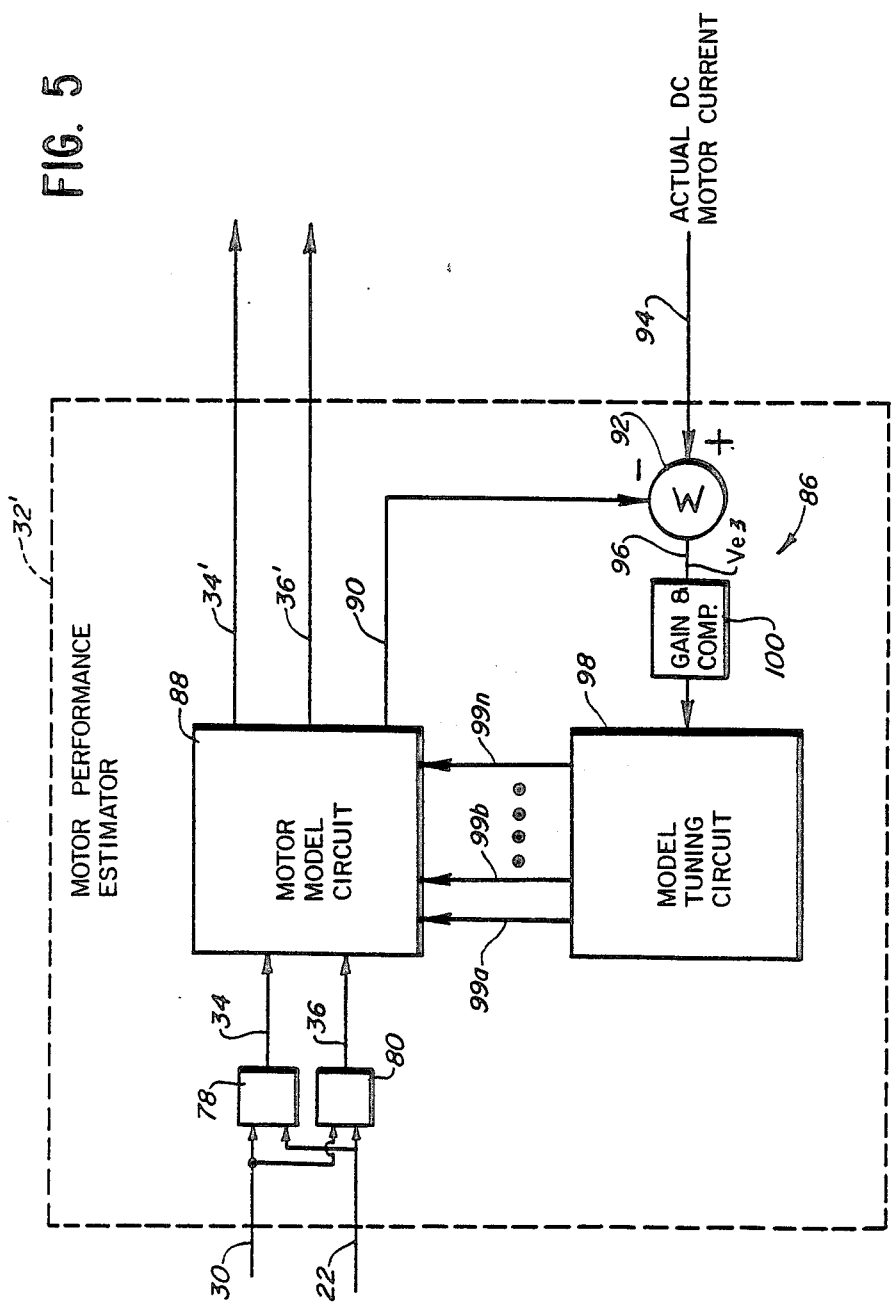
FIG. 5 is a block diagram of a second or alternative embodiment of the present invention.

It should be noted that the function generator of FIG. 2 utilizes an open loop form of control with regard to motor operating current. Referring now to FIG. 5 a second embodiment of the present invention is illustrated which comprises a closed-loop brushless DC motor control.

In the second embodiment, a motor performance function generator 32' incorporates the elements of the function generator 32 of the preferred embodiment, and further includes a feedback loop 86. A motor modeling circuit or block 88 develops a signal on a line 90 representing the predicted DC motor stator current which should result in response to the commutation angle command signal and the voltage command signal on the lines 34 and 36 respectively.

The predicted DC motor current signal on the line 90 is coupled to a third summing junction 92 along with an actual DC motor current signal on a line 94 to develop an error signal $V_{e3}$ on a line 96. The actual DC motor current signal on the line 94 is generated by any appropriate means, such as a Hall effect sensor. The error signal $V_{e3}$ on the line 96 is coupled to a model tuning block 98. In general, the model tuning block 98 develops a series of tuning signals on lines 99a, 99b, ... 99n which are then coupled to the motor model block 88 to in turn modify the commutation angle command signal and the voltage command signal to compensate for and minimize the error in DC motor current to further improve motor performance. The modified commutation angle command signal is developed on a line 34' while a modified voltage command signal is developed on a line 36'. These signals are coupled to the motor electronics control circuit 38, previously discussed in connection with FIG. 1, to operate the motor with the desired operational characteristics.

The present invention is effective to permit operation of a permanent magnet brushless DC motor in a commanded fashion so that the motor exhibits desired performance characteristics.

More specifically, the motor model block 88 may comprise a function generator which is implemented in hardware or software. The block 88 implements a mathematical model of the operational characteristics of the brushless DC motor as a function of, for example, the resistance of the windings of the motor. In this case, the signal on the line 90 represents the predicted DC current which should result in light of the assumed winding resistance and the commutation and voltage command signals. An error between the actual and predicted currents as represented by the error signal $V_{e3}$ causes the model tuning circuit 98 to adjust the mathematical model implemented by the block 88. This adjustment in turn modifies the output signals 34', 36' so that the error in motor current is minimized.

If necessary, a gain and compensation circuit 100 may be inserted between the summing junction 92 and the model tuning circuit 98.

In effect, the embodiment of FIG. 5 introduces an additional variable, i.e. winding resistance, to the control of the instant invention so that the motor is operated in a more precise fashion.

I claim:

1. A control for a brushless DC motor that includes a permanent magnet rotor and a stator having stator coils which are energized in accordance with a commutation angle command signal and a voltage command signal for imparting rotation to the rotor, comprising:
   first means for developing a motor performance command signal representing a desired operational characteristic of the motor;
   second means for developing a motor feedback signal representing an actual motor operational characteristic; and
   means coupled to the first and second means for deriving the commutation angle command signal and the voltage command signal from the motor performance command signal and the motor feedback signal so that the motor operates with the desired operational characteristic, wherein the deriving means includes means implementing first and second bivariate functions for deriving the commutation angle signal and voltage command signal, respectively.

2. The control of claim 1, wherein the first bivariate function is represented by a first series of mathematical curves representing the relationship between the motor performance command, the motor feedback and the commutation angle command, and the second bivariate function is represented by a second series of mathematical curves representing the relationship between the motor performance command, the motor feedback and the voltage command signal.

3. A control for a brushless DC motor that includes a permanent magnet rotor and a stator having stator coils which are energized in accordance with a commutation angle command signal and a voltage command signal for imparting rotation to the rotor, comprising:
   first means for developing a motor performance command signal representing a desired operational characteristic of the motor;
   second means for developing a motor feedback signal representing an actual motor operational characteristic;
   means coupled to the first and second means for deriving the commutation angle command signal and the voltage command signal from the motor performance command signal and the motor feedback signal so that the motor operates with the desired operational characteristic;
   third means for developing a signal representing a predicted performance characteristic of the motor;
   fourth means for developing a signal representing an actual motor performance characteristic; and
   means coupled to the third and fourth means for modifying the commutation angle command signal and the voltage command signal to further improve motor performance.

4. A control for a brushless DC motor driven by a voltage source inverter, the motor including a permanent magnet rotor and a stator having stator coils which are energized in accordance with a commutation angle command signal and a voltage command signal for imparting rotation to the rotor to drive a load, comprising:
   first means for developing an input command signal representing a desired operational characteristic of the load;
   second means for developing a load feedback signal representing an actual operational characteristic of the load;
   third means for developing a motor feedback signal representing an actual motor operational characteristic;
   fourth means coupled to the first, second and third means for developing therefrom a motor performance command signal representing a desired operational characteristic of the motor; and
   means coupled to the third and fourth means for deriving the commutation angle command signal and voltage command signal from the motor performance command signal and the motor feedback signal so that the motor operates with the desired operational characteristic.

5. The control of claim 4, wherein the deriving means includes means for storing a mathematical model of the operation of the brushless DC motor.

6. The control of claim 4, wherein the deriving means includes means implementing first and second bivariate functions for deriving the commutation angle command signal and the voltage command signal, respectively.

7. The control of claim 6, wherein the first bivariate function is represented by a first series of mathematical curves representing the relationship between the motor performance command, the motor feedback and the commutation angle command, and the second bivariate function is represented by a second series of mathematical curves representing the relationship between the motor performance command, the motor feedback and the voltage command.

8. The control of claim 4, further comprising fifth means for developing a predicted performance characteristic of the motor, sixth means for developing an actual motor performance characteristic, and means coupled to the fifth and sixth means for modifying the commutation angle command signal and the voltage command signal to further improve motor performance.

9. In a control for a brushless DC motor that includes a permanent magnet rotor and a stator having stator coils which are energized in accordance with a commutation angle command signal and a voltage command signal for imparting rotation to the rotor, the improvement comprising:

first means for developing a motor performance command signal representing a desired operational characteristic of the motor and second means for developing a motor feedback signal representing an actual motor operational characteristic; and a function generator coupled to the first and second means, the function generator including means for storing a mathematical model of the operation of the motor, wherein the storing means is responsive to the first and second means and includes means implementing first and second bivariate functions for deriving the commutation angle command signal and the voltage command signal, respectively.

10. The improvement of claim 9, wherein the first bivariate function is represented by a first series of mathematical curves representing the relationship between the motor performance command, the motor feedback and the commutation angle, and the second bivariate function is represented by a second series of mathematical curves representing the relationship between the motor performance command, the motor feedback and the voltage command.

11. In a control for a brushless DC motor that includes a permanent magnet rotor and a stator having stator coils which are energized in accordance with a commutation angle command signal and a voltage command signal for imparting rotation to the rotor, the improvement comprising:

first means for developing a motor performance command signal representing a desired operational characteristic of the motor and second means for developing a motor feedback signal representing an actual motor operational characteristic;

a function generator coupled to the first and second means, the function generator including means for storing a mathematical model of the operation of the motor, whereby the function generator is responsive to the first and second means and derives the commutation angle command signal and the voltage command signal; and third means for developing a signal representing a predicted performance characteristic of the motor, fourth means for developing a signal representing an actual motor performance characteristic, and means coupled to the third and fourth means for modifying the commutation angle command signal and the voltage command signal to further improve motor performance.

* * * * *